US010798106B2

(12) United States Patent
Belz et al.

(10) Patent No.: US 10,798,106 B2
(45) Date of Patent: *Oct. 6, 2020

(54) SYSTEM FOR PROVIDING LAYERED SECURITY

(71) Applicant: AT&T Intellectual Property I, L.P., Atlanta, GA (US)

(72) Inventors: Steven Belz, Sunnyvale, TX (US); James H. Pratt, Round Rock, TX (US); Marc A. Sullivan, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/260,344

(22) Filed: Jan. 29, 2019

(65) Prior Publication Data
US 2019/0158507 A1 May 23, 2019

Related U.S. Application Data

(63) Continuation of application No. 14/971,171, filed on Dec. 16, 2015, now Pat. No. 10,200,380.

(51) Int. Cl.
*H04L 29/06* (2006.01)
*H04W 12/06* (2009.01)

(52) U.S. Cl.
CPC ......... *H04L 63/105* (2013.01); *H04L 63/08* (2013.01); *H04L 63/0853* (2013.01); *H04W 12/06* (2013.01)

(58) Field of Classification Search
CPC ... H04L 63/105; H04L 63/08; H04L 63/0853; H04W 12/06
See application file for complete search history.

(56) References Cited

U.S. PATENT DOCUMENTS 8,150,108 B2 * 4/2012 Miller ............... G06K 9/00892
340/5.53
8,305,936 B2 11/2012 Wang
(Continued)

OTHER PUBLICATIONS

Connected World, "Smarter Identity verification Leverages IoT Devices," connectedworld.com, May 29, 2015. http://connectedworld.com/smarter-identity-verification-leverages-iot-devices/.
(Continued)

*Primary Examiner* — Cheng-Feng Huang
(74) *Attorney, Agent, or Firm* — Guntin & Gust, PLLC; Andrew D. Raymond

(57) ABSTRACT

A system for providing layered security is disclosed. In particular, the system may include determining a state of a first device of a device ecosystem and a state of a second device of the device ecosystem. Based on the states of the first and second devices, the system may include calculating a confidence score for the device ecosystem. If the confidence score satisfies a threshold score for enabling access to a selected system, the system may include transmitting an access code to the device ecosystem. Based on the access code, the system may enable the device ecosystem to access the selected system. If, however, the confidence score does not satisfy the threshold score, the system may include requiring the device ecosystem to provide additional authentication information in order to access the selected system.

20 Claims, 4 Drawing Sheets

(56) References Cited

U.S. PATENT DOCUMENTS

| | | | |
|---|---|---|---|
| 8,358,197 B2 | 1/2013 | Tran | |
| 8,427,979 B1 | 4/2013 | Wang | |
| 8,810,392 B1 | 8/2014 | Teller et al. | |
| 8,857,705 B2 | 10/2014 | Larson et al. | |
| 8,935,769 B2 | 1/2015 | Hessler | |
| 9,016,565 B2 | 4/2015 | Zhou et al. | |
| 9,118,488 B2 | 8/2015 | Donaldson | |
| 9,137,246 B2 | 9/2015 | Parry et al. | |
| 9,706,406 B1* | 7/2017 | Adams | H04L 63/102 |
| 9,883,472 B1* | 1/2018 | Tamhane | H04W 56/001 |
| 2002/0184217 A1 | 12/2002 | Bisbee et al. | |
| 2011/0219427 A1 | 9/2011 | Hito et al. | |
| 2013/0104238 A1 | 4/2013 | Balsan et al. | |
| 2014/0157355 A1 | 6/2014 | Clancy et al. | |
| 2014/0157392 A1 | 6/2014 | Smith et al. | |
| 2014/0201807 A1 | 7/2014 | White et al. | |
| 2014/0359722 A1 | 12/2014 | Schultz et al. | |
| 2015/0081056 A1 | 3/2015 | Yeh et al. | |
| 2015/0082406 A1* | 3/2015 | Park | H04L 63/0853 726/9 |
| 2015/0113621 A1* | 4/2015 | Glickfield | H04L 63/08 726/7 |
| 2015/0161370 A1 | 6/2015 | North et al. | |
| 2015/0227724 A1* | 8/2015 | Grigg | H04L 63/083 726/5 |
| 2015/0229625 A1* | 8/2015 | Grigg | H04L 63/08 726/6 |
| 2015/0237049 A1* | 8/2015 | Grajek | H04L 63/0815 726/7 |
| 2015/0237071 A1* | 8/2015 | Maher | H04W 4/70 726/1 |
| 2015/0244699 A1 | 8/2015 | Hessler | |
| 2015/0281239 A1* | 10/2015 | Brophy | H04L 63/10 726/4 |
| 2016/0006744 A1* | 1/2016 | Du | H04L 63/102 726/4 |
| 2017/0063889 A1* | 3/2017 | Muddu | G06F 16/9024 |
| 2017/0087453 A1* | 3/2017 | Poisner | A63F 13/211 |

OTHER PUBLICATIONS

Madsen, "Authentication in the IoT—challenges and opportunities," Secure ID News, secureidnews.com, Jan. 6, 2015. http://www.secureidnews.com/news-item/authentication-in-the-iot-challenges-and-opportunities/.

Jansen et al., "Proximity Beacons and Mobile Device Authentication: An Overview and Implementation," National Institute of Standard and Technology, U.S. Dept. of Commerce, NISTIR 7200, csrc.nist.gov, Jun. 2005. http://csrc.nist.gov/publications/NIST-IR-7200.pdf.

Fin, "Sansa Security Reveals 2015 Iot Predictions," Sansa Security, blog.sansasecurity.com, Dec. 9, 2014. http://blog.sansasecurity.com/sansa-security-reveals-2015-iot-predictions.

Frahim et al., "Securing the Internet of Things: A Proposed Framework," Cisco, cisco.com, accessed: Sep. 2015. http://www.cisco.com/web/about/security/intelligence/iot_framework.html.

Jansen et al., "Proximity-Based Authentication for Mobile Devices," Security and Management, 2005. http://csrc.nist.gov/groups/SNS/mobile_security/documents/mobile_devices/pp-proximityAuthentication-fin.pdf.

* cited by examiner

SYSTEM FOR PROVIDING LAYERED SECURITY

CROSS REFERENCE TO RELATED APPLICATIONS

This application is a continuation of and claims the benefit of U.S. application Ser. No. 14/971,171, filed Dec. 16, 2015, which is hereby incorporated by reference in its entirety.

FIELD OF THE INVENTION

The present application relates to network security technologies, sensor technologies, mobile device technologies, and wearable device technologies, and more particularly, to a system and method for providing layered security.

BACKGROUND

In today's society, users are increasingly utilizing network and other service providers to gain access to the Internet, access software services, request and receive various types of content, access software applications, and perform a variety of other tasks and functions. As such users have become increasingly comfortable with technology in terms of performing their daily tasks, such users have begun to incorporate and integrate such technologies into many different facets of their lives. In particular, an increasing number of users are taking advantage of the Internet of Things (IoT), which is the network of physical objects embedded with software, sensors, electronics, and network connectivity that allows these objects to collect and exchange data between each other and with remote systems. For example, users are utilizing IoT devices to monitor and control various electrical and mechanical devices and systems at their homes, such as, but not limited to, lighting systems, air conditioning systems, ventilation systems, appliances, communication systems, entertainment systems, and security systems. Such systems and devices may often be remotely controlled by users via applications that execute on the users' smartphones.

While current technologies provide for many benefits and efficiencies, current technologies, such as IoT technologies, still have many shortcomings. In particular, current versions IoT technologies often provide limited ways in which to authenticate users into various systems and networks. For example, if a smartphone that is utilized to control a home automation system is stolen from a user, current technologies may enable the thief to remotely control the user's home automation system. While passive biometric devices have been utilized to authenticate users, such passive biometric devices are often very expensive to implement because they require specialized hardware. As a result, current methodologies and technologies associated with authenticating users may be modified so as to provide enhanced quality-of-service for users and companies. Such enhancements and improvements to methodologies and technologies may provide for improved customer satisfaction, increased security, and increased ease-of-use.

SUMMARY

A system and accompanying methods for providing layered security are disclosed. In particular, the system and methods may enable a group of devices that create a unique device ecosystem encompassing one or more digital devices in proximity with one another to accurately authenticate and/or recognize an individual. In certain embodiments, the system and methods may incorporate biometric technologies in combination with the presence information of devices in the device ecosystem to further improve the reliability of the authentication. In order to accomplish the foregoing, the system and methods may involve utilizing an individual's device ecosystem, which may consist of the one or more devices an individual typically carries with him or herself. In certain embodiments, the device ecosystem may not only include carried devices, but also, any devices in proximity with one another. The device ecosystem may create a unique mesh network that enables or prepares the first of a two-part authentication process for gaining access to nearby systems that the individual and/or device ecosystem is attempting to access.

The system and methods may include sensing a device ecosystem that is attempting to access a particular system and determining the states of various devices in the device ecosystem. Based on the states of the various devices in the device ecosystem, the systems and methods may calculate a confidence score for the device ecosystem. If the calculated confidence score for the device ecosystem satisfies a threshold confidence score for accessing the system, the system and methods may generate an access code and transmit the access code to the device ecosystem. By utilizing the access code, the device ecosystem may proceed to log into or otherwise access the system automatically. If, however, the calculated confidence score for the device ecosystem does not meet the threshold confidence score for accessing the system, the system and methods may include requiring a normal (or even a greater than normal) log on sequence for the device ecosystem to access the system. As an example, if a user's smart watch was detected, but the user's smartphone and key ring were not detected, the system and methods may include transmitting a notification to the smartphone (or other device) inquiring as to whether such a log in should be permitted. If so, the user may enter in a log on sequence, passcode, biometric identifier, or other authentication information, to enable the device ecosystem to access the system. In effect, the present disclosure provides a conditional two-factor security system to authenticate a user and/or device ecosystem before providing the user and/or device ecosystem with access to one or more systems.

In one embodiment, a system for providing layered security is disclosed. The system may include a memory that stores instructions and a processor that executes the instructions to perform various operations of the system. The system may perform an operation that includes detecting a first device belonging to a device ecosystem comprising a plurality of devices associated with a user. The system may then perform an operation that includes determining if a second device of the plurality of devices is in proximity to the first device. Based on the second device being determined to be in proximity with the first device, the system may perform an operation that includes calculating a confidence score for the device ecosystem. If the confidence score satisfies a threshold, the system may perform an operation that includes transmitting an access code to the device ecosystem. The system may perform an operation that includes enabling, based on the access code, the device ecosystem to access the second system.

In another embodiment, a method for providing layered security is disclosed. The method may include utilizing a memory that stores instructions, and a processor that executes the instructions to perform the various functions of the method. In particular, the method may include determining a first state of a first device belonging to a device ecosystem comprising a plurality of devices associated with a user. Additionally, the method may include determining a second state of a second device of the plurality of devices of the ecosystem. Based on the first state of the first device and the second state of the second device, the method may include calculating a confidence score for the device ecosystem. If the confidence score satisfies a threshold, the method may include transmitting an access code to the device ecosystem. Finally, the method may include enabling, based on the access code, the device ecosystem to access the system.

According to yet another embodiment, a computer-readable device having instructions for providing layered security is provided. The computer instructions, which when loaded and executed by a processor, may cause the processor to perform operations including: determining a first state of a first device belonging to a device ecosystem comprising a plurality of devices associated with a user; determining a second state of a second device of the plurality of devices of the ecosystem, wherein the second state of the second device indicates a proximity of the second device with respect to the first device; calculating a confidence score for the device ecosystem based on the first state of the first device and the second state of the second device; transmitting, if the confidence score satisfies a threshold, an access code to the device ecosystem, wherein the access code is utilized to access a system; and enabling, based on the access code, the device ecosystem to access the system.

These and other features of the systems and methods for providing layered security are described in the following detailed description, drawings, and appended claims.

DETAILED DESCRIPTION OF THE DRAWINGS

Figure 1:
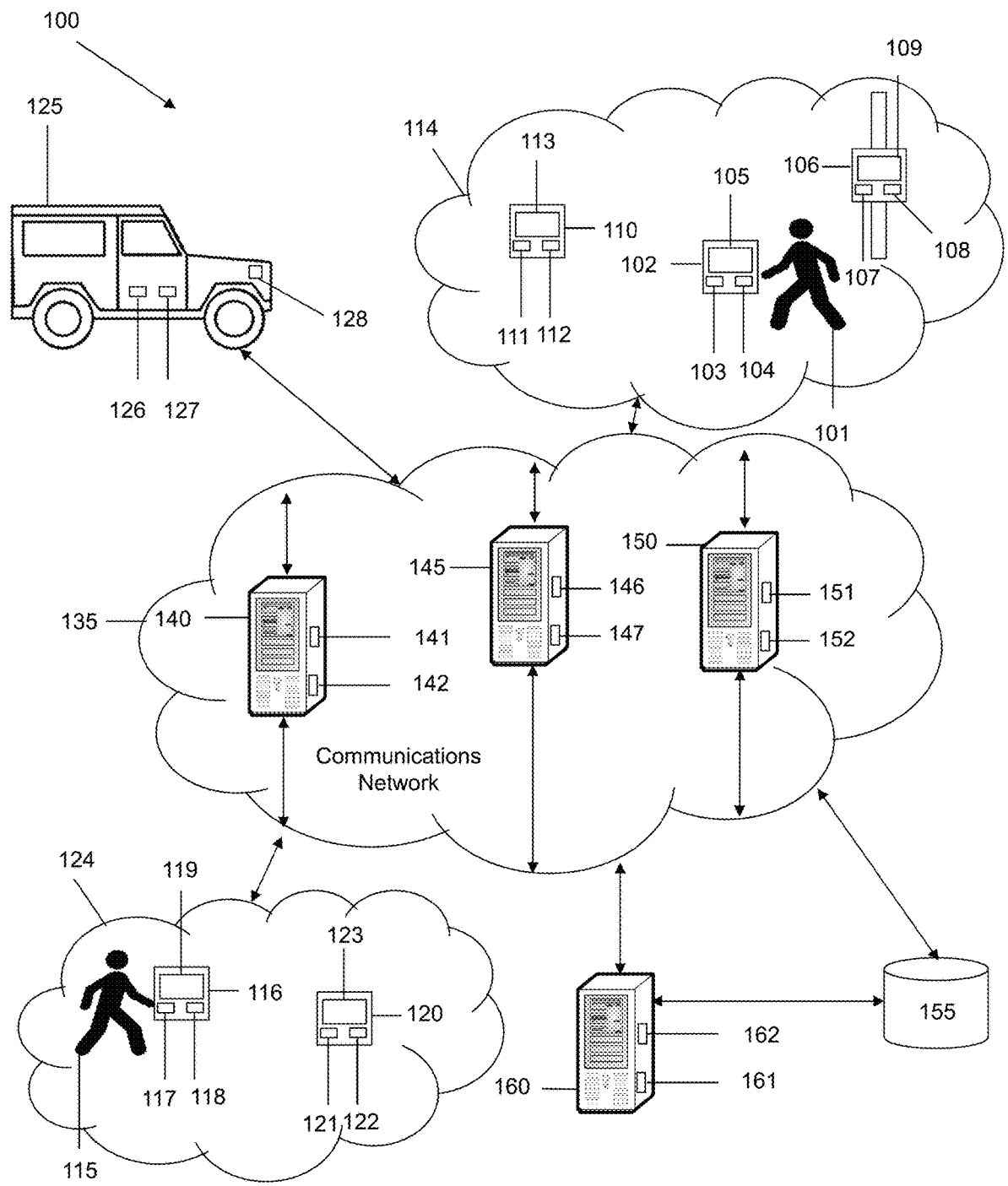
FIG. 1 is a schematic diagram of a system for providing layered security according to an embodiment of the present disclosure.

A system 100 and accompanying methods for providing layered security are disclosed. In particular, the system 100 and methods may enable a group of devices that create a unique device ecosystem (e.g. first device ecosystem 114 and/or second device ecosystem 124) encompassing one or more digital devices in proximity with one another to accurately authenticate and/or recognize an individual, such as first user 101. In certain embodiments, the system 101 and methods may incorporate biometric technologies in combination with the presence information of devices in the device ecosystem to further improve the reliability of the authentication. In order to accomplish the foregoing, the system 100 and methods may involve utilizing an individual's device ecosystem, which may consist of the one or more devices an individual typically carries with him or herself. In certain embodiments, the device ecosystem may not only include carried devices, but also any devices in proximity with one another. The device ecosystem may create a unique mesh network that enables or prepares the first of a two-part authentication process for gaining access to nearby systems that the individual and/or device ecosystem is attempting to access.

Notably, the system 100 and methods may include sensing a device ecosystem that is attempting to access a particular system and may include determining the states of various devices in the device ecosystem. Based on the states of the various devices in the device ecosystem, the system 100 and methods may calculate a confidence score for the device ecosystem. If the calculated confidence score for the device ecosystem satisfies a threshold confidence score for accessing the system, the system 100 and methods may include generating an access code and transmit the access code to the device ecosystem. By utilizing the access code, the device ecosystem may proceed to log into or otherwise access the system. If, however, the calculated confidence score for the device ecosystem does not meet the threshold confidence score for accessing the system, the system and methods may include requiring a normal (or even a greater than normal) log on sequence for the device ecosystem to access the system. As an example, if a user's smart watch was detected, but the user's smartphone and key ring were not detected, the system and methods may include transmitting a notification to the smart watch (or other device) inquiring as to whether such a log in should be permitted. If so, the user may enter in a log on sequence, passcode, biometric identifier, or other authentication information, so as to enable the device ecosystem to access the system. As a result, the present disclosure provides a conditional two-factor security system to authenticate a user and/or device ecosystem before providing them with access to one or more systems.

Figure 2:
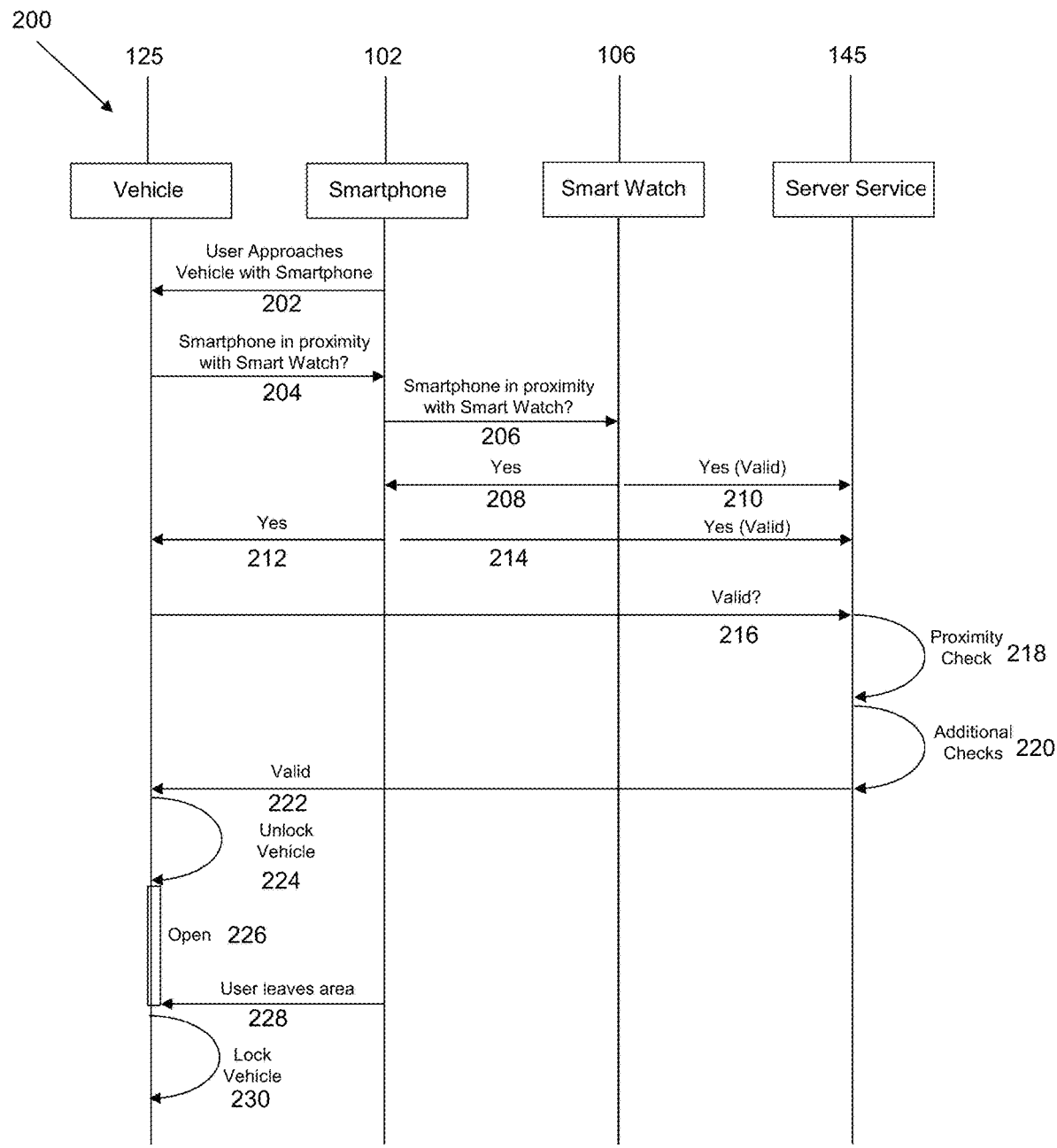
FIG. 2 is a schematic diagram illustrating a flow diagram detailing use of the system of FIG. 1 according to an example scenario.

As shown in FIGS. 1-2, a system 100 for providing layered security is disclosed. The system 100 may be configured to support, but is not limited to supporting, content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. In certain embodiments, the first user 101 may be a subscriber of a service provider that controls communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be a computer, a laptop, a set-top-box, a tablet device, a phablet, a server, a mobile device, a smartphone, a smart watch, and/or any other type of computing device. Illustratively, the first user device 102 is shown as a smartphone device in FIGS. 1-2.

In addition to using first user device 102, the first user 101 may also utilize a second user device 106 and a third user device 110. As with first user device 102, the first user 101 may utilize the second and third user devices 106, 110 to transmit signals to access various online services and content, such as those provided by a content provider or service provider associated with communications network 135. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. The second user device 106 may also include an interface 109 that may enable the first user 101 to interact with various applications executing on the second user device 106 and to interact with the system 100. In certain embodiments, the second user device 106 may be a computer, a laptop, a set-top-box, a tablet device, a phablet, a server, a mobile device, a smartphone, a smart watch, and/or any other type of computing device. Illustratively, the second user device 102 is shown as a smart watch device in FIGS. 1-2.

The third user device 110 may include a memory 111 that includes instructions, and a processor 112 that executes the instructions from the memory 111 to perform the various operations that are performed by the third user device 110. In certain embodiments, the processor 112 may be hardware, software, or a combination thereof. The third user device 110 may also include an interface 113 that may enable the first user 101 to interact with various applications executing on the third user device 110 and to interact with the system 100. In certain embodiments, the third user device 106 may be a computer, a laptop, a set-top-box, a tablet device, a phablet, a server, a mobile device, a smartphone, a smart watch, and/or any other type of computing device. Illustratively, the third user device 110 is shown as a tablet device in FIGS. 1-2.

The first, second, and third user devices 102, 106, 110 may belong to and/or form a first device ecosystem 114. In certain embodiments, the first device ecosystem 114 may be a unique mesh network that enables and/or prepares the first part of a two-part authentication process for gaining access to nearby systems, such as a vehicle system associated with vehicle 125. In certain embodiments, the first device ecosystem 114 may be formed between the first, second, and third user devices 102, 106, 110 through the use of any type of wireless protocol and/or technology. For example, the first, second, and third user devices 102, 106, 110 may communicate with one another in the first device ecosystem 114 by utilizing Bluetooth Low Energy (BLE), classic Bluetooth, ZigBee, cellular, near-field communications (NFC), Wi-Fi, Z-Wave, ANT+, IEEE 802.15.4, IEEE 802.22, ISA100a, infrared (IrDA), ISM band, radio frequency identification (RFID), UWB, Wireless HD, Wireless USB, any other protocol and/or wireless technology, or any combination thereof.

The first, second, and third user devices 102, 106, 110 belonging to the first device ecosystem 114 may share and exchange data with each other via the first device ecosystem 114. For example, the first, second, and third user devices 102, 106, 110 may share information relating to the various components of the first, second, and third user devices 102, 106, 110, information identifying the first, second, and third user devices' 102, 106, 110 locations, information identifying the first, second, and third user devices' 102, 106, 110 power levels, information identifying the types of connections utilized by the first, second, and third user devices 102, 106, 110, information identifying the applications being utilized on the first, second, and third user devices 102, 106, 110, information identifying how the first, second, and third user devices 102, 106, 110 are being utilized by a user, information identifying whether the first, second, and third user devices 102, 106, 110 are moving and in what direction, information identifying an orientation of the first, second, and third user devices 102, 106, 110, information identifying whether the first, second, and third user devices 102, 106, 110 have been stolen, information identifying which user is logged into the first, second, and third user devices 102, 106, 110, information identifying user profiles for users of the first, second, and third user devices 102, 106, 110, information identifying device profiles for the first, second, and third user devices 102, 106, 110, information identifying the number of devices in the first device ecosystem 114, information identifying devices being added to or removed from the first device ecosystem 114, any information obtained from any sensor of the first, second, and third user devices 102, 106, 110, any other information, or any combination thereof.

Information obtained from the sensors of the first, second, and third user devices 102, 106, 110 may include, but is not limited to, temperature readings from temperature sensors of the first, second, and third user devices 102, 106, 110, ambient light measurements from light sensors of the first, second, and third user devices 102, 106, 110, sound measurements from acoustic sensors of the first, second, and third user devices 102, 106, 110, vibration measurements from vibration sensors of the first, second, and third user devices 102, 106, 110, global positioning information from global positioning devices of the first, second, and third user devices 102, 106, 110, pressure readings from pressure sensors of the first, second, and third user devices 102, 106, 110, proximity information from proximity sensors of the first, second, and third user devices 102, 106, 110, motion information from motion sensors of the first, second, and third user devices 102, 106, 110, presence information from presence sensors of the first, second, and third user devices 102, 106, 110, heart rate sensor information from heart rate sensors of the first, second, and third user devices 102, 106, 110, gas information from gas sensors of the first, second, and third user devices 102, 106, 110, orientation information from gyroscopes of the first, second, and third user devices 102, 106, 110, tilt information from tilt sensors of the first, second, and third user devices 102, 106, 110, acceleration information from accelerometers of the first, second, and third user devices 102, 106, 110, information from any other sensors, or any combination thereof. In certain embodiments, information from the sensors of the first, second, and third user devices 102, 106, 110 may be transmitted via one or more signals to each other and to the components of the system 100.

In addition to the first user 101, the system 100 may also include a second user 115, who may utilize a fourth user device 116 to perform a variety of functions. For example, the fourth user device 116 may be utilized by the second user 115 to transmit signals to request various types of content, services, and data provided by content and service providers associated with the communications network 135 or any other network in the system 100. The fourth user device 116 may include a memory 117 that includes instructions, and a processor 118 that executes the instructions from the memory 117 to perform the various operations that are performed by the fourth user device 116. In certain embodiments, the processor 118 may be hardware, software, or a combination thereof. The fourth user device 116 may also include an interface 119 (e.g. screen, monitor, graphical user interface, etc.) that may enable the second user 115 to interact with various applications executing on the fourth user device 116 and to interact with the system 100. In certain embodiments, the fourth user device 116 may be a computer, a laptop, a set-top-box, a tablet device, a phablet, a server, a mobile device, a smartphone, a smart watch, and/or any other type of computing device. Illustratively, the fourth user device 116 is shown as a smartphone device in FIG. 1.

The second user 115 may also utilize a fifth user device 120 to perform a variety of functions. As with the fourth user device 116, the fifth user device 120 may be utilized by the second user 115 to transmit signals to request various types of content, services, and data provided by content and service providers associated with the communications network 135 or any other network in the system 100. The fifth user device 120 may include a memory 121 that includes instructions, and a processor 122 that executes the instructions from the memory 121 to perform the various operations that are performed by the fifth user device 120. In certain embodiments, the processor 122 may be hardware, software, or a combination thereof. The fifth user device 120 may also include an interface 123 (e.g. screen, monitor, graphical user interface, etc.) that may enable the second user 115 to interact with various applications executing on the fifth user device 120 and to interact with the system 100. In certain embodiments, the fifth user device 120 may be a computer, a laptop, a set-top-box, a tablet device, a phablet, a server, a mobile device, a smartphone, a smart watch, and/or any other type of computing device. Illustratively, the fifth user device 120 is shown as a tablet device in FIG. 1.

The fourth and fifth user devices 116, 120 may belong to and/or form a second device ecosystem 124. In certain embodiments, the second device ecosystem 124 may be a unique mesh network that enables and/or prepares the first part of a two-part authentication process for gaining access to nearby systems. The fourth and fifth user devices 116, 120 belonging to the second device ecosystem 124 may share and exchange data with each other via the second device ecosystem 124 in a similar fashion as the first, second, and third user devices 102, 106, 110 do in the first device ecosystem 114. Additionally, the fourth and fifth user devices 116, 120 may communicate with each other and share similar types of information with each other as the first, second, and third user devices 102, 106, 110 do in the first device ecosystem 114. In certain embodiments, the second device ecosystem 124 may be communicatively linked with the first device ecosystem 114 and/or the communications network 135. In certain embodiments, information and data from the first device ecosystem 114 may be shared with the second device ecosystem 124 and the communications network 135. Similarly, information from the second device ecosystem 124 may be shared with the first device ecosystem 114 and the communications network 135.

In certain embodiments, the first user device 102, the second user device 106, the third user device 110, the fourth user device 116, and/or the fifth user device 120 may have any number of software applications and/or application services stored and/or accessible thereon. For example, the first, second, third, fourth, and fifth user devices 102, 106, 110, 116, 120 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 115 to interact with any device in the system 100, any network in the system 100, or any combination thereof. In certain embodiments, the first, second, third, fourth, and fifth user devices 102, 106, 110, 116, 120 may include associated telephone numbers, device identities, or any other identifiers to uniquely identify the first, second, third, fourth, and fifth user devices 102, 106, 110, 116, 120.

The system 100 may include a vehicle 125, which may be any type of mobile connected device, such as an unmanned mobile connected vehicle (e.g. autonomous vehicle), a passenger vehicle, or a combination thereof. In certain embodiments, the system 100 may include any number of vehicles 125, and the vehicle 125 may be a car, a truck, a train, a plane, a boat, a ship, a trolley, a motorcycle, a bike, any type of vehicle, any type of moving device, or any combination thereof. The vehicle 125 may include a memory 126 that includes instructions, and a processor 127 that executes the instructions from the memory 126 to perform the various operations that are performed by the vehicle 125. In certain embodiments, the processor 127 may be hardware, software, or a combination thereof. In certain embodiments, the vehicle 125 may include one or more cameras 128, which may be utilized to record media content of anything within the field of view of the cameras 128. The various systems, features, and functionality of the vehicle 125 may be controlled by the system 100 and/or the communications network 135.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, the first device ecosystem 114, the second device ecosystem 124, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the first device ecosystem 114, the second device ecosystem 124, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the vehicle 125, the servers 140, 145, 150, 160, the first user device 102, the second user device 106, the third user device 110, the fourth user device 116, the fifth user device 120, any devices in the system 100, any other device, any network, or any combination thereof.

The database 155 may also store information and metadata obtained from the system 100, store metadata and other information associated with the first and second users 101, 115, store user profiles associated with the first and second users 101, 115, store device profiles associated with any device in the system 100, store communications traversing the system 100, store user preferences, store information associated with any device or signal in the system 100, store information relating to patterns of usage relating to the first, second, third, fourth, and fifth user devices 102, 106, 110, 116, 120, store any information obtained from any of the networks in the system 100, confidence scores, threshold confidence scores, store historical data associated with the first and second users 101, 115, store device characteristics, store information relating to any devices associated with the first and second users 101, 115, store any information associated with the vehicle 125, store biometric information associated with the first and second users 101, 115, store log on sequences and/or authentication information, store information associated with the first and second device ecosystems 114, 124, store access codes, store access tokens, store lists identifying the specific devices included within the first and second device ecosystems 114, 124, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Operatively, the system 100 may provide for layered security, as shown in the following exemplary scenario. In this example, the states of the devices discussed relate to proximity, however, any type of state may be analyzed to determine whether a particular device, device ecosystem, and/or user should be able to be authorized to access a particular system. In the example scenario and referring to FIG. 1, the first user 101 and the second user 115 may both be attempting to access a vehicle system of the vehicle 125. When the first user 101 attempts to access the vehicle system of the vehicle 125, such as by utilizing an application executing on first user device 102, the server service provided by servers 140, 145, 150 may determining a state of the first user device 102 attempting to access the vehicle system. The server service may also determine a state of the second user device 106 and a state of the third user device 110. The first, second, and third user devices 102, 106, 110 may each belong to the first device ecosystem 114 and may share information with one another and the server service. The server service may receive proximity information from the first, second and third user devices 102, 106, 110, such as from proximity sensors from each of the devices and/or global positioning data obtained from each of the devices.

Based on the proximity information obtained from the first, second, and third user devices 102, 106, 110, the server service may determine that all three devices are in proximity with one another. The server service may also determine that all three devices are in proximity with the vehicle 125 based on location data provided by a global positioning system of the vehicle 125. Based on this information, the server service may calculate a confidence score for the device ecosystem 114 that may be utilized to authenticate the device ecosystem 114 with the vehicle system. Details relating to calculating confidence score are described in further detail in other portions of the present disclosure. Once the confidence score is calculated, the server service may determine if the confidence score for the first device ecosystem 114 satisfies a threshold confidence score required to access the vehicle system. For example, if the confidence score for the first device ecosystem 114 is 80 and the threshold confidence score for accessing the vehicle system is 70, the confidence score for the first device ecosystem 114 satisfies the threshold confidence score. If the confidence score of the first device ecosystem 114 satisfies the threshold confidence score, the system 100 may transmit an access code to the first device ecosystem 114, such as by transmitting the access code to the first user device 102. The access code may be a code that is generated by the system 100 and the access code may be tokenized. The first device ecosystem 114 may process the code into an access token, such in a similar manner as performed for a RSA token. The access token and/or access code may then be utilized by the first device ecosystem 114 to log into, or otherwise access, the vehicle system. For example, after accessing the vehicle system, the vehicle 125 may be started, the vehicle 125 may be unlocked, or any other action may be performed with respect to the vehicle 125.

If, however, the confidence score for the first device ecosystem 114 does not satisfy the threshold confidence score for accessing the vehicle system, the system 100 may transmit a message and/or notification to the first device ecosystem 114 indicating that a log on sequence and/or other authentication information is required to access the vehicle system. The threshold confidence score may not satisfy the threshold confidence score if, for example, the first and second user devices 102, 106 are determined to be in proximity with one another, but the third user device 110 is determined to not be in proximity with either the first or second user devices 102, 106. The log on sequence and/or authentication information may include a string of characters, a unique passcode, a software key, a username/password combination, a sequence of images, any type of sequence, or any combination thereof. The system 100, such as via the server service, may receive the log on sequence and/or authentication information from the first device ecosystem 114, such as via an input made by the first user 101 on the first user device 102.

Once the log on sequence and/or authentication information are received, the system 100 may determine if the log on sequence and/or authentication information match a predetermined log on sequence/authentication information for accessing the vehicle system. For example, if the log on sequence received was the passcode "sjmaccesscode" and predetermined log on sequence was also "sjmaccesscode," then the sequences would match. If the sequences do not match, the first device ecosystem 114 may be prevented from accessing the vehicle system. If, however, the sequences do match, the first device ecosystem 114 may be provided access to the vehicle system, such as via one or more applications.

With regard to the second device ecosystem 124, the system 100 may determine that while the fourth user device 116 is in proximity with the vehicle 125, the fifth user device 120 is not in proximity with the vehicle 125 or the fourth user device 116. In such a scenario, the system 100 may calculate a confidence score based on these conditions and the confidence score may not satisfy the threshold confidence score required to access the vehicle system. In such a scenario, the second device ecosystem 124 may be prevented from accessing the vehicle system. If, however, the fifth user device 120 eventually comes into proximity with the vehicle 125 and/or the fourth user device 116, the second device ecosystem 124 may be provided access to the vehicle system. Notably, any type of state may be analyzed by the system 100 and for the purposes of this example, the proximity states of the devices in the device ecosystems were analyzed to grant access to the vehicle system of the vehicle 125.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, determining a first state of a first device attempting to access a system; determining a second state of a second device; calculating a confidence score for a device ecosystem based on the first and second states of the first and second devices; determining if the calculated confidence score satisfies a threshold confidence score for accessing the system; transmitting and generating access codes; enabling the device ecosystem to access the system; transmitting messages to the device ecosystem indicating that a log on sequence and/or authentication information are needed to access the system; receiving the log on sequence and/or authentication information from the device ecosystem; determining if the log on sequence and/or authentication information received matches a predetermined log on sequence/authentication information for accessing the system; preventing the device ecosystem from accessing the system; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrate specific example configurations of the various components of the system 100, the system 100 may include any configuration of the components, which may include using a greater or lesser number of the components. For example, the system 100 is illustratively shown as including a first user device 102, a second user device 106, a third user device 110, a fourth user device 116, a fifth user device 120, a vehicle 125, a first device ecosystem 114, a second device ecosystem 114, a communications network 135, a server 140, a server 145, a server 150, a server 160, and a database 155. However, the system 100 may include multiple first user devices 102, multiple second user devices 106, multiple third user devices 110, multiple fourth user devices 116, multiple fifth user devices 120, multiple vehicles 125, multiple first device ecosystems 114, multiple second device ecosystems 124, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

As shown in FIG. 2, an exemplary method 200 for providing layered security in the context of accessing a vehicle system of a vehicle 125 is schematically illustrated. The vehicle system may be a system that controls the features and operations conducted by the vehicle 125 and the vehicle system may be controlled by system 100. For example, the vehicle system may control the locks on the car, starting or turning off the car, turning on or off air conditioning or ventilation, turning on or off radio equipment of the vehicle 125, turning on or off a computer of the vehicle 125, any other function or feature of the vehicle, or any combination thereof. In this example, the state of the devices being monitored relates to the proximity of the devices with one another. At step 202, the method 200 may include having first user 101 approach the vehicle 125 with first user device 102, which may be a smartphone. As the first user 101 is approaching the vehicle 125, the vehicle system of the vehicle 125 may detect the presence of the smartphone via BLE and/or any other wireless or wired technology and communicate with the smartphone.

At step 204, the method 200 may include having the vehicle system of the vehicle 125 transmit a signal to the smartphone requesting the smartphone to indicate whether the smartphone is in proximity with a second user device 106, which may be a smart watch that is part of the same device ecosystem that the first user device 102 belongs to. At step 206, the method 200 may include having the smartphone transmit a signal to the smart watch requesting the smart watch to indicate if the smart watch is in proximity with the smartphone. At step 208, the method 200 may include having the smart watch indicate that the smart watch is in proximity with the smartphone by transmitting a signal to the smartphone. At step 210, the method 200 may include having the smart watch transmit a signal to the server service provided by the servers 140, 145, 150 indicating that the smartphone is in proximity with the smart watch. Also, at step 210, the method 200 may include having the server service confirm whether the proximity information received is valid. At step 212, the method 200 may include having the smartphone transmit a signal to the vehicle 125 indicating that the smartphone is in proximity with the smart watch. At step 214, the method 200 may include having the smartphone transmit a signal to the server service indicating that the smartphone is in proximity with the smart watch. At step 216, the method 200 may include having the vehicle system of the vehicle 125 transmit a request to the server service requesting the server service to confirm that proximity information provided by the smart watch and the smartphone.

At step 218, the method 200 may include having the server service conduct a proximity check by comparing the proximity information provided by the smartphone, smart watch, and/or the vehicle system to determine if the proximity information is valid. At step 220, the method 200 may include having the server service perform any number of additional checks, such as, but not limited to, checks relating to whether the smartphone and/or smart watch have been stolen, the smartphone and smart watch's proximity to one or more other devices, the smartphone and smart watch's location, the context of the smartphone and/or smart watch, the power level (e.g. battery level) of the smart watch and/or smartphone, the security state of the smartphone and/or smart watch, whether the smartphone and/or smart watch are actively being used by the first user 101, whether the smart watch and/or smart phone is communicating with another device, whether the smart watch and/or smartphone has sufficient security systems required by the vehicle system to access the vehicle system, whether the smartphone and/or smart watch are moving or not moving, whether the smartphone and/or smart watch are moving in a certain direction, whether the smartphone and/or smart watch is a certain type of device, whether the smartphone and/or smart watch is in communication with a certain type of device, any other checks, or any combination thereof.

If the information associated with the smartphone and smart watch are determined by the server service to be valid based on the proximity checks and/or additional checks, the server service may transmit, at step 222 of the method 200, a signal to the vehicle system indicating that the information is valid and that the first user 101 and the device ecosystem 114 are authenticated to access one or more features the vehicle system. In certain embodiments, the server service may calculate a confidence score based on the proximity information provided and transmit the score to the vehicle system. If the first user 101 wanted the vehicle 125 to unlock one or more of its doors, the vehicle system may unlock one or more doors of the vehicle 125 at step 224 of the method 200. The doors may be unlocked based on the server service determining that the information associated with the smartphone and smart watch is valid and/or based on the confidence score satisfying a threshold confidence score for accessing the vehicle system. At step 226, the method 200 may include opening the doors of the vehicle 125. At step 228, the method 200 may include having the user leave the area where the car is located in such that the smartphone that the user is carrying and smart watch, which may be located elsewhere, are no longer in proximity. At step 230, since the smartphone and smart watch are no longer in proximity, the first device ecosystem 114 may be prevented from accessing the vehicle system and the doors of the vehicle 125 may be locked. In certain embodiments, the server service may cause the car to be locked based on the information indicating that the smartphone and smart watch are no longer in proximity with each other and/or based on the confidence score being lower now that the smartphone and smart watch are no longer in proximity with each other. Notably, the method 200 may further incorporate any of the features and functionality described for the system 100, method 300, or as otherwise described herein.

Figure 3:
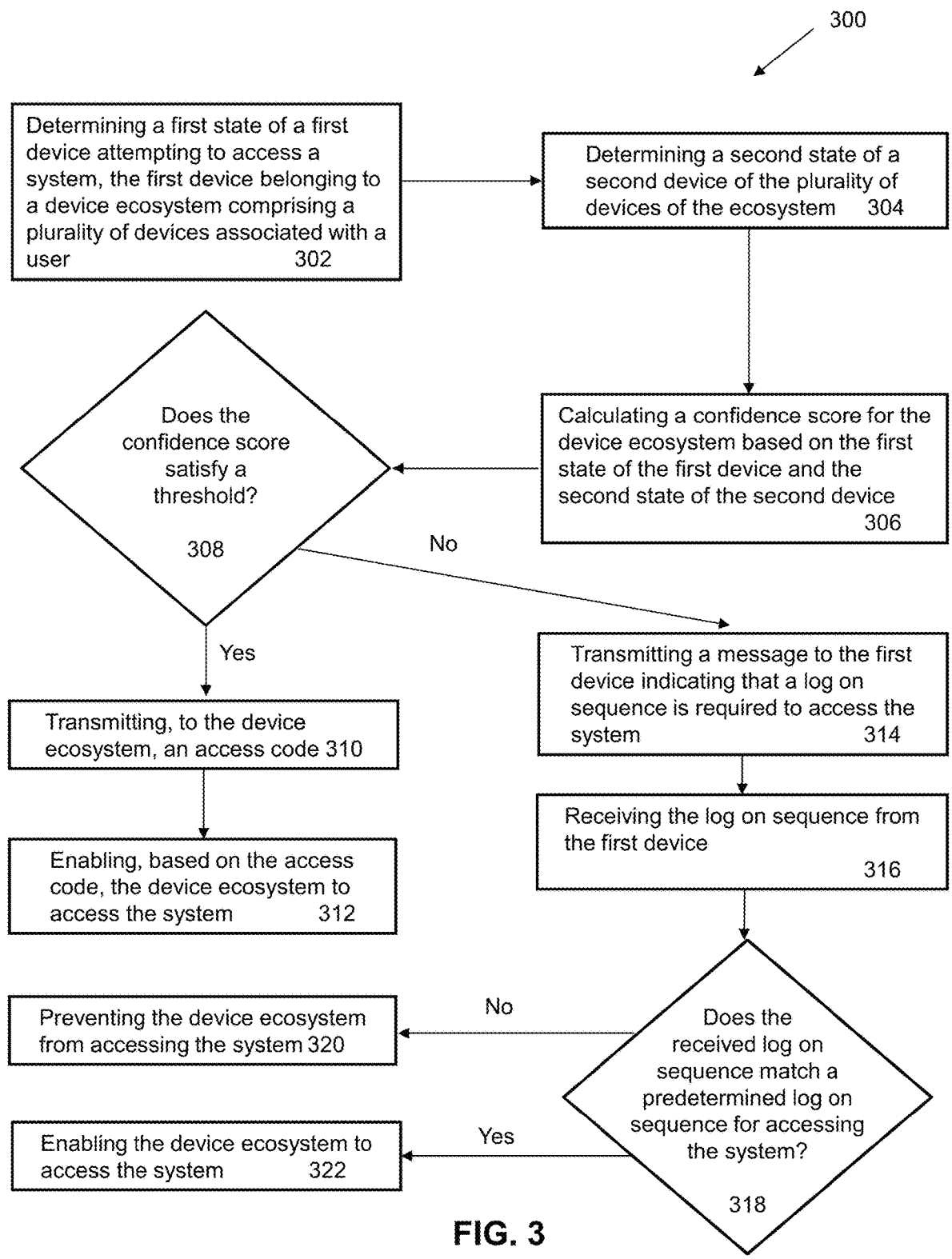
FIG. 3 is a flow diagram illustrating a sample method for providing layered security according to an embodiment of the present disclosure.

As shown in FIG. 3, an exemplary method 300 for providing layered security is schematically illustrated. The method 300 may include steps for enabling a device ecosystem (e.g. first device ecosystem 114 and/or second device ecosystem 124) to access a particular system, such as system 100. The method 300 may include, at step 302, determining a first state of a first device attempting to access a system, such as a media content system. The first device may belong to a device ecosystem that includes a plurality of devices associated with a user, such as first user 101. In certain embodiments, the determining of the first state of the first device may be determined by utilizing the first user device 102, the second user device 106, the third user device 110, the vehicle 125, the server 140, the server 145, the server 150, the server 160, the communications network 135, the first device ecosystem 114, the second device ecosystem 124, any combination thereof, or by utilizing any other appropriate program, network, system, or device. The state of the first device may include, but is not limited to, the first device's proximity to one or more other devices, the first device's location, the first device's context, the first device's power level (e.g. battery level), the first device's security state, whether the first device is being used by a user, whether the first device is communicating with another device, whether the first device has sufficient security systems required to access the system, whether the first device has been stolen, whether the first device is moving or not moving, whether the first device is moving in a certain direction, whether the first device is a certain type of device, whether the first device is in communication with a certain type of device, the proximity of the first device to the system, any other state associated with the first device, or any combination thereof.

At step 304, the method 300 may include determining a second state of a second device belonging to the device ecosystem including the plurality of devices associated with the user. As with the first state for the first device, the second state for the second device may include, but is not limited to, the second device's proximity to one or more other devices, the second device's location, the second device's context, the second device's power level (e.g. battery level), the second device's security state, whether the second device is being used by a user, whether the second device is communicating with another device, whether the second device has sufficient security systems required to access the system, whether the second device has been stolen, whether the second device is moving or not moving, whether the second device is moving in a certain direction, whether the second device is a certain type of device, whether the second device is in communication with a certain type of device, the proximity of the second device to the system, any other state associated with the second device, or any combination thereof. In certain embodiments, the determining of the second state of the second device may be determined by utilizing the first user device 102, the second user device 106, the third user device 110, the fourth user device 116, the fifth user device 120, the vehicle 125, the server 140, the server 145, the server 150, the server 160, the communications network 135, the first device ecosystem 114, the second device ecosystem 124, any combination thereof, or by utilizing any other appropriate program, network, system, or device.

At step 306, the method 300 may include calculating a confidence score for the device ecosystem based on the first state of the first device and the second state of the second device. For example, if the first state of the first device indicates that the first device is being carried by the first user 101 and the first device is in proximity with the second device, and the second state of the second device indicates that the second device is also being carried by the first user 101 and the second device is in proximity with the first device, the confidence score may be calculated based on these states. Using the above example, the first state may be assigned a value of 5 and the second state may also be assigned a value of 5 because both states are similar. The confidence score for the device ecosystem, for example, may be calculated by adding the values of the states, which, in this case, would result in a confidence score of 10. Using a different example, if the first state of the first device stays the same, however, the second state of the second device indicates that the second device is not being carried by the first user 101, but the second device is still in proximity with the first device, the confidence score may be different. Using this example, the first state of the first device may still be assigned a value of 5 and the second state of the second device may be assigned a lower value of 3 since the second device is not being carried by the first user 101. In this case, the confidence score may be 8 for the device ecosystem associated with the first and second devices. In certain embodiments, the calculating of the confidence score may be performed by utilizing the first user device 102, the second user device 106, the third user device 110, fourth user device 116, the fifth user device 120, the vehicle 125, the server 140, the server 145, the server 150, the server 160, the communications network 135, the first device ecosystem 114, the second device ecosystem 124, any combination thereof, or by utilizing any other appropriate program, network, system, or device.

Once the confidence score for the ecosystem is calculated, the method 300 may include, at step 308, determining if the confidence score for the device ecosystem satisfies a threshold confidence score required by the system that the first device is attempting to access. For example, the confidence score for the device ecosystem may be 10 and the threshold confidence score for the system the first device is attempting to access may be 10. In this case, the confidence score calculated for the device ecosystem would satisfy the threshold. In certain embodiments, the determining may be performed by utilizing the first user device 102, the second user device 106, the third user device 110, fourth user device 116, the fifth user device 120, the vehicle 125, the server 140, the server 145, the server 150, the server 160, the communications network 135, the first device ecosystem 114, the second device ecosystem 124, any combination thereof, or by utilizing any other appropriate program, network, system, or device. If the confidence score of the device ecosystem satisfies the threshold confidence score, the method 300 may include, at step 310, transmitting an access code to the device ecosystem, such as by transmitting the access code to the first device. The access code may be a code that is generated by the system 100 and the access code may be tokenized. In certain embodiments, the transmitting may be performed by utilizing the server 140, the server 145, the server 150, the server 160, the communications network 135, any combination thereof, or by utilizing any other appropriate program, network, system, or device. Once the device ecosystem receives the access code, the device ecosystem may process the access code into an access token.

At step 312, the method 300 may include enabling, based on the access code/access token, the device ecosystem to access the system. For example, the first device may utilize the access code/access token to authenticate into the system and access the features, functionality, and services of the system. In certain embodiments, the enabling may be facilitated by utilizing the first user device 102, the second user device 106, the third user device 110, fourth user device 116, the fifth user device 120, the vehicle 125, the server 140, the server 145, the server 150, the server 160, the communications network 135, the first device ecosystem 114, the second device ecosystem 124, any combination thereof, or by utilizing any other appropriate program, network, system, or device.

If, however, the confidence score for the device ecosystem does not satisfy the threshold confidence score for accessing the system, the method 300 may include, at step 314, transmitting a message and/or notification to the device ecosystem indicating that a log on sequence and/or other authentication information is required to access the system. The log on sequence and/or authentication information may include a string of characters, a unique passcode, a software key, a username/password combination, a sequence of images, any type of sequence, or any combination thereof. In certain embodiments, the transmitting may be performed by utilizing the first user device 102, the second user device 106, the third user device 110, fourth user device 116, the fifth user device 120, the vehicle 125, the server 140, the server 145, the server 150, the server 160, the communications network 135, any combination thereof, or by utilizing any other appropriate program, network, system, or device. At step 316, the method 300 may include receiving the log on sequence and/or authentication information from the device ecosystem, such as from the first device. In certain embodiments, the receiving may be performed by utilizing the first user device 102, the second user device 106, the third user device 110, fourth user device 116, the fifth user device 120, the vehicle 125, the server 140, the server 145, the server 150, the server 160, the communications network 135, any combination thereof, or by utilizing any other appropriate program, network, system, or device.

Once the log on sequence and/or authentication information are received, the method 300 may include, at step 318, determining if the log on sequence and/or authentication information match a predetermined log on sequence/authentication information for accessing the system. For example, if the log on sequence received was the string "x12345sjm" and predetermined log on sequence was also "x12345sjm," then the sequences match. In certain embodiments, the determining may be performed by utilizing the first user device 102, the second user device 106, the third user device 110, fourth user device 116, the fifth user device 120, the vehicle 125, the server 140, the server 145, the server 150, the server 160, the communications network 135, any combination thereof, or by utilizing any other appropriate program, network, system, or device. If the sequences do not match, the method 300 may include, at step 320, preventing the device ecosystem from accessing the system. In certain embodiments, the preventing may be performed by utilizing the vehicle 125, the server 140, the server 145, the server 150, the server 160, the communications network 135, any combination thereof, or by utilizing any other appropriate program, network, system, or device. If, however, the sequences do match, the method 300 may include, at step 322, enabling the device ecosystem to access the system. In certain embodiments, the enabling may be performed by utilizing the vehicle 125, the server 140, the server 145, the server 150, the server 160, the communications network 135, any combination thereof, or by utilizing any other appropriate program, network, system, or device. Notably, the method 300 may repeated as necessary, such as when any ecosystem attempts to access a particular system, such as system 100 or any other system. Notably, the method 300 may further incorporate any of the features and functionality described for the system 100, method 200, or as otherwise described herein.

The systems and methods disclosed herein may include additional functionality and features. For example, based on the functionality provided by the systems and methods, validations performed by the devices in a device ecosystem may be performed in parallel with validations performed by the server service provided by the servers 140, 145, 150. In certain embodiments, the confidence scores and the states utilized to calculate the confidence scores may be percentage-based. For example, if a state of a first device of a device ecosystem indicates that the first device is being utilized and carried by the first user 101 and the state of a second device of the same device ecosystem indicates that the second device is far away from the first user 101, the first state may have a higher value when calculating the confidence score than the second state. For example, the first state may be given a value of 0.80 and the second state may be given a value of 0.05, and the two values may be added or even averaged to arrive at a confidence score. If the values are added the confidence score may be 85%, but if the values are averaged the confidence score may be 42.5%. In certain embodiments, each validation and/or state may have a probability associated with it and may be utilized to calculate a confidence score for a device ecosystem.

In certain embodiments, the systems and methods may also utilize various types of biometric measurements in conjunction with the functionality provided by the system 100 to further authenticate a user. For example, in the event that the confidence score for a device ecosystem associated with a user does not satisfy a threshold confidence score for accessing a certain system, the systems and methods may include transmitting a notification to a device in the device ecosystem to provide a biometric identifier, such as, a fingerprint to confirm the user's identity and/or that the device ecosystem is under the control of the user. In certain embodiments, any type of biometric identifier may be utilized, such as, but not limited to, fingerprints, palm veins, faces, DNA, palm prints, hand geometry, irises, retinas, odors, voices, height, weight, any other identifier, or any combination thereof. The biometric identifiers may be obtained via one or more scanners and may be input into the system 100 via an interface of a device of a device ecosystem.

Biometric identifiers may be stored in database 155 and the stored biometric identifiers may be utilized by the system 100 to determine if a biometric identifier received during the authentication process matches a stored identifier corresponding to an authorized user. In certain embodiments, a biometric identifier may be utilized to boost a confidence score. For example, if a confidence score for a device ecosystem is 75% and the threshold confidence score for accessing a particular system is 80%, the system 100 may request a biometric identifier from the user to reach the threshold confidence score. If the system 100 receives a confirmed fingerprint of an authorized user, then the confidence score may be increased beyond the 80% threshold confidence score value required to access the system. At that point, the identity of the individual may be authenticated and the device ecosystem may be given access to the system.

In certain embodiments, the systems and methods may utilize different threshold confidence scores to grant access to different levels of access associated with the system that a device ecosystem is attempting to access. For example, a threshold score of 50% may only be required to access a gaming application provided by a certain system, but a threshold score of 85% may be required to access a database of the same system that contains confidential information. The threshold scores may be adjusted by an owner of the system or other authorized user of a system. In certain embodiments, validation requirements to access a particular system may change based on the context of the particular situation. For example, if a user is attempting to access a home automation system to unlock a door of a house, the confidence score and/or validation requirements for accessing the home automation system may be tougher as compared with the confidence score and/or validations required for a user attempting to turn on a television that is part of a media content system. In certain embodiments, the validation requirements may change based on the types of devices in a particular device ecosystem. For example, if a first device ecosystem contains a smart watch, a tablet, and a smartphone that are all identified to be associated with the same user, the validation requirements for the first device ecosystem may be easier than the validation requirements required for a second device ecosystem that simply has multiple random servers in it that are not associated with a particular individual.

In certain embodiments, the server service provided by the servers 140, 145, 150 may be utilized to confirm that the states provided by devices in a particular device ecosystem are truly what the devices indicate that the states are. For example, if a temperature sensor of a first device indicates that it is 73 degrees at the location of the first device, the server service may access a national weather center resource to confirm that the reported 73 degrees is accurate. If the value reported by the temperature sensor is inaccurate, the confidence score for the device ecosystem may be lowered and/or flagged. In certain embodiments, the server service may directly access the sensor of the first device to confirm whether the reading is 73 degrees or not. If the reading is confirmed, then the server service can validate the reading provided by the first device.

In certain embodiments, the states of the devices in a device ecosystem may be indicative of any condition associated with a particular device, an individual using the device, or a combination thereof. Using a traffic monitoring device ecosystem as an example, if a road sensor transmits a signal that there is no traffic on the road, the fact that there is no traffic on the road may be indicative of the state of the road sensor. Similarly, if media content obtained by a traffic camera that is part of the same device ecosystem as the road sensor indicates that a pedestrian is crossing the street, this information may correspond with the state of the traffic camera. Using this same example, the states of the road sensor and traffic camera may be utilized to calculate a confidence score associated with the device ecosystem associated with the road sensor and traffic camera.

In certain embodiments, the systems and methods may provide a device ecosystem with access to a particular system if a threshold number of devices in the device ecosystem are within proximity with one another. For example, if a user has a device ecosystem that includes a smart thermostat, a smartphone of a user, and a set-top-box and if each of these devices are determined by the system 100 to be in proximity with one another, the user may be automatically granted access (e.g. without having to enter additional authentication credentials) to a media content system that the user is attempting to access if the minimum number of devices to access the media content system is three. If, however, the smartphone is not in proximity with the set-top-box and smart thermostat, the system 100 may prevent the user from accessing the media content system because the number of devices in proximity with one another is only two.

In further embodiments, the systems and methods may analyze broadcast signatures (e.g. internet protocol address, location identifiers, or other identifiers) from various devices to confirm the identity of an individual and/or device ecosystem. Additionally, the presence of historically co-located devices may serve as another indicator of identity and authentication of an individual and/or device ecosystem. A device ecosystem may even include devices carried by other people that a particular user has a trusted relationship with, such as family members or friends. In certain embodiments, the systems and methods may be utilized to require the authorization of more than one individual to fulfill one authorization condition. For example, in the medical field, disposal of narcotics often requires two individuals. In such a scenario, two individuals (and their accompanying device ecosystems) may need to be authenticated to authorize access to a narcotics system that controls the dispensing of narcotics.

In still further embodiments, the server service may be utilized to locate devices in a device ecosystem that may be lost or misplaced. For example, if a first device is lost and is not in proximity with a second device in the device ecosystem, the first device may still be able to communicate with the server service, and the server service may transmit a notification to the second device indicating the location of the first device.

Figure 4:
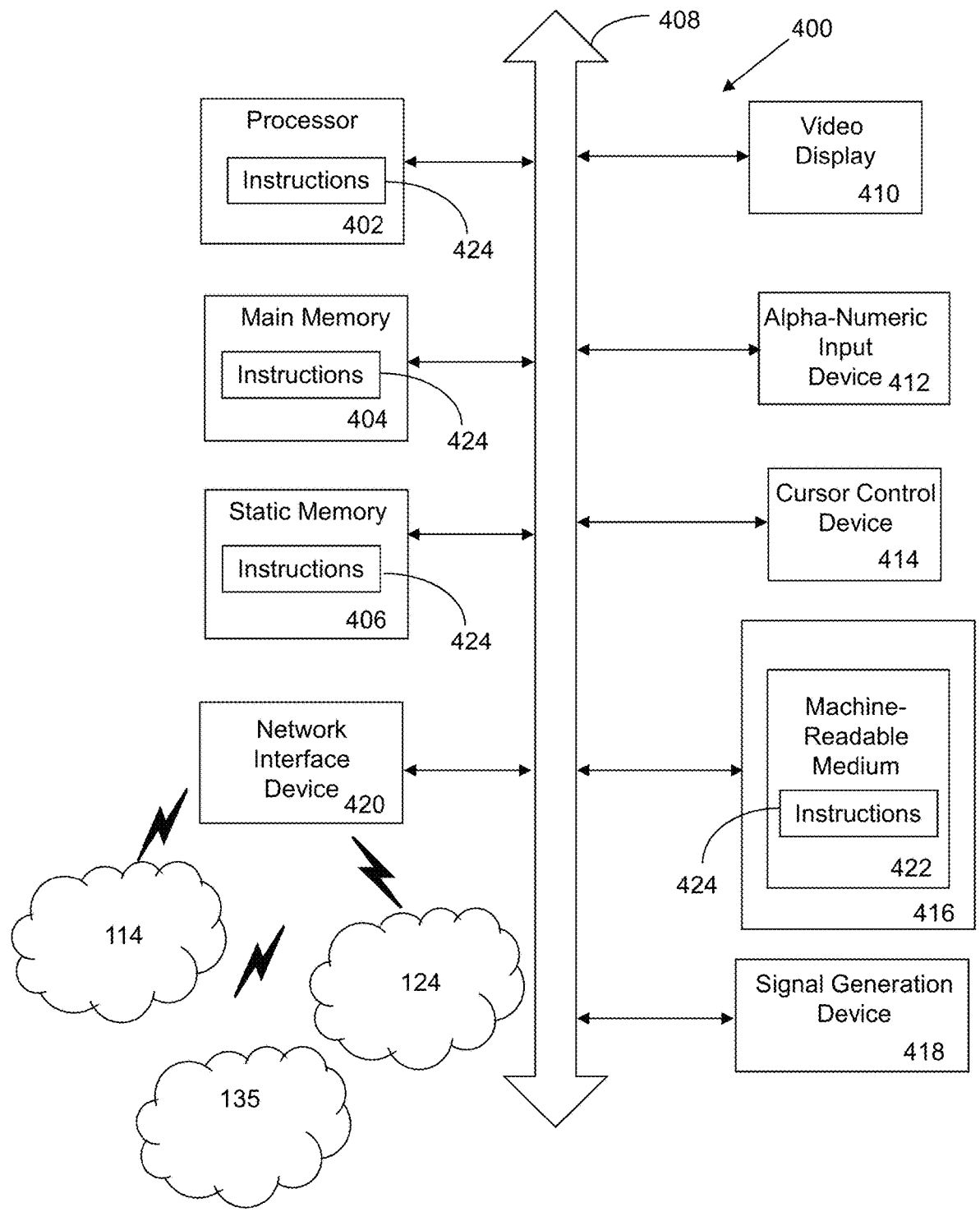
FIG. 4 is a schematic diagram of a machine in the form of a computer system within which a set of instructions, when executed, may cause the machine to perform any one or more of the methodologies or operations of the systems and methods for providing layered security.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, first device ecosystem 114, second device ecosystem 124, another network, or a combination thereof) to and assist with operations performed by other machines and systems, such as, but not limited to, the first user device 102, the second user device 106, the third user device 110, the first device ecosystem 114, the fourth user device 116, the fifth user device 120, the second device ecosystem 124, the vehicle 125, the server 140, the server 145, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, the first device ecosystem 114, the second device ecosystem 124, another network, or a combination thereof, can send or receive voice, video or data, and communicate over the communications network 135, the first device ecosystem 114, the second device ecosystem 124, another network, or a combination thereof, using the instructions. The instructions 424 may further be transmitted or received over the communications network 135, the first device ecosystem 114, the second device ecosystem 124, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A first system, comprising:
   a memory that stores instructions;
   a processor that executes the instructions to perform operations, the operations comprising:
   enabling a device ecosystem to access a first portion of a second system based on a confidence score of the device ecosystem satisfying a first threshold for a specific level of access for accessing the first portion of the second system;
   determining if the confidence score satisfies a second threshold for accessing a second portion of the second system, wherein the second threshold is different from the first threshold;
   preventing the device ecosystem from accessing the second portion of the second system if the confidence score does not satisfy the second threshold;
   providing the device ecosystem with access to the second portion of the second system if the confidence score does satisfy the second threshold;
   adjusting a validation requirement for accessing the second portion of the second system in response to a different device ecosystem attempting to access the second system, wherein the validation requirement is adjusted based on types of devices in the different device ecosystem;
   determining, if the confidence score does not meet the first threshold, if a third device is in proximity with a first device and a second device of the device ecosystem; and
   adjusting the confidence score if the third device is in proximity with the first device and the second device.

2. The first system of claim 1, wherein the operations further comprise transmitting, if an increased confidence score satisfies the first threshold, an access code to the device ecosystem.

3. The first system of claim 1, wherein the operations further comprise determining that the first device and the second device belong to the device ecosystem.

4. The first system of claim 1, wherein the operations further comprise determining if the second device is in proximity with the first device.

5. The first system of claim 4, wherein the operations further comprise calculating the confidence score for the device ecosystem based on the second device being determined to be in proximity with the first device.

6. The first system of claim 1, wherein the operations further comprise adjusting the second threshold based on a context associated with accessing the second system.

7. The first system of claim 1, wherein the operations further comprise providing the device ecosystem with access to the second system if a threshold number of devices in the device ecosystem are in proximity to each other.

8. The first system of claim 1, wherein the operations further comprise analyzing a broadcast signature of the first device to confirm an identity of an individual associated with the first device, the device ecosystem, or a combination thereof.

9. The first system of claim 1, wherein the operations further comprise determining if a fourth device of the device ecosystem is lost.

10. The first system of claim 9, wherein the operations further comprise determining a location of the fourth device.

11. The first system of claim 10, wherein the operations further comprise transmitting a notification to the first device, the second device, the third device, or a combination thereof, indicating the location of the fourth device.

12. The first system of claim 1, wherein the operation further comprise requesting, if the confidence score does not satisfy the first threshold, a biometric identifier from the device ecosystem.

13. The first system of claim 12, wherein the operation further comprise providing the device ecosystem with access to the first portion of the second system if the biometric identifier confirms an identity of a user associated with the device ecosystem.

14. A method, comprising:
enabling a device ecosystem to access a first portion of a system based on a confidence score of the device ecosystem satisfying a first threshold for a specific level of access for accessing the first portion of the system;
determining, by utilizing instructions from a memory that are executed by a processor, if the confidence score satisfies a second threshold for accessing a second portion of the system, wherein the second threshold is different from the first threshold;
preventing the device ecosystem from accessing the second portion of the system if the confidence score does not satisfy the second threshold;
providing the device ecosystem with access to the second portion of the system if the confidence score does satisfy the second threshold;
adjusting a validation requirement for accessing the second portion of the system in response to a different device ecosystem attempting to access the system, wherein the validation requirement is adjusted based on types of devices in the different device ecosystem;
determining, if the confidence score does not meet the first threshold, if a third device is in proximity with a first device and a second device of the device ecosystem; and
adjusting the confidence score if the third device is in proximity with the first device and the second device.

15. The method of claim 14, further comprising determining a first state of the first device of the device ecosystem and a second state of the second device of the device ecosystem.

16. The method of claim 15, further comprising providing, when calculating the confidence score, a higher value to the first device if the first state indicates that the first device is being used by a user and the second state indicates that the second device is located away from the user.

17. The method of claim 14, further comprising providing an access code to the device ecosystem for accessing the system.

18. The method of claim 17, further comprising processing the access code into an access token.

19. The method of claim 14, further comprising adjusting the confidence score based on a first state associated with the first device and a second state associated with the second device.

20. A computer-readable device comprising a hardware processor and instructions, which when executed by the hardware processor, cause the hardware processor to perform operations comprising:
enabling a device ecosystem to access a first portion of a system based on a confidence score of the device ecosystem satisfying a first threshold for a specific level of access for accessing the first portion of the system;
determining, by utilizing instructions from a memory that are executed by a processor, if the confidence score satisfies a second threshold for accessing a second portion of the system, wherein the second threshold is different from the first threshold;
preventing the device ecosystem from accessing the second portion of the system if the confidence score does not satisfy the second threshold;
providing the device ecosystem with access to the second portion of the system if the confidence score does satisfy the second threshold;
modifying a validation requirement for accessing the second portion of the system in response to a different device ecosystem attempting to access the system, wherein the validation requirement is adjusted based on types of devices in the different device ecosystem;
determining, if the confidence score does not meet the first threshold, if a third device is in proximity with a first device and a second device of the device ecosystem; and
modifying the confidence score if the third device is in proximity with the first device and the second device.

* * * * *